US010952200B2

(12) United States Patent
Ren et al.

(10) Patent No.: US 10,952,200 B2
(45) Date of Patent: Mar. 16, 2021

(54) INDICATION METHOD AND APPARATUS FOR TRANSMITTING PHYSICAL CONTROL CHANNEL

(71) Applicant: HUAWEI TECHNOLOGIES CO., LTD., Guangdong (CN)

(72) Inventors: Haibao Ren, Shanghai (CN); Yi Huang, Shenzhen (CN); Yuanjie Li, Shanghai (CN); Zheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/368,652

(22) Filed: Mar. 28, 2019

(65) Prior Publication Data
US 2019/0223169 A1 Jul. 18, 2019

Related U.S. Application Data

(63) Continuation of application No. PCT/CN2017/104200, filed on Sep. 29, 2017.

(30) Foreign Application Priority Data

Sep. 30, 2016 (CN) .......................... 2016 1 0877940

(51) Int. Cl.
*H04W 72/04* (2009.01)
*H04W 76/27* (2018.01)
(Continued)

(52) U.S. Cl.
CPC ........ *H04W 72/042* (2013.01); *H04B 7/0619* (2013.01); *H04B 7/088* (2013.01);
(Continued)

(58) Field of Classification Search
CPC .... H04B 7/0871; H04B 7/068; H04B 7/0619; H04B 7/0689; H04B 7/088; H04L 27/00;
(Continued)

(56) References Cited

U.S. PATENT DOCUMENTS 8,687,601 B2 * 4/2014 Xu ........................ H04B 7/0628
370/334
8,837,625 B2 * 9/2014 Ko ....................... H04W 72/042
375/284
(Continued)

FOREIGN PATENT DOCUMENTS

CN 101355408 A 1/2009
CN 101777941 A 7/2010
(Continued)

OTHER PUBLICATIONS

International Search Report, dated Dec. 29, 2017, in International Application No. PCT/CN2017/104200 (5 pp.).
(Continued)

*Primary Examiner* — Man U Phan
(74) *Attorney, Agent, or Firm* — Leydig, Voit & Mayer, Ltd.

(57) ABSTRACT

The present application relates to an indication method for transmitting a physical control channel. The method includes: determining, by a radio node, one of space frequency block coding SFBC transmission and single frequency transmission, as a receiving mode used by user equipment to receive a downlink physical control channel; and sending, by the radio node, an indication message to the user equipment, where the indication message is used to instruct the user equipment to receive, in the receiving mode, the downlink physical control channel sent by the radio node. The user equipment receives the downlink
(Continued)

physical control channel according to the receiving mode, thereby improving system performance.

9 Claims, 4 Drawing Sheets

(51) Int. Cl.
*H04L 5/00* (2006.01)
*H04L 27/00* (2006.01)
*H04B 7/08* (2006.01)
*H04B 7/06* (2006.01)
*H04W 88/02* (2009.01)

(52) U.S. Cl.
CPC ............ *H04L 5/0023* (2013.01); *H04L 27/00* (2013.01); *H04W 72/044* (2013.01); *H04W 76/27* (2018.02); *H04W 88/02* (2013.01)

(58) Field of Classification Search
CPC ... H04L 5/0053; H04L 5/0094; H04L 5/0023; H04W 76/27; H04W 72/042; H04W 88/02; H04W 72/044; H04W 72/04
USPC ......................................................... 370/329
See application file for complete search history.

(56) References Cited

U.S. PATENT DOCUMENTS

| | | | | |
|---|---|---|---|---|
| 8,982,747 B2* | 3/2015 | Koo | ...................... | H04B 7/0452 370/295 |
| 8,982,779 B2* | 3/2015 | Li | ........................ | H04B 7/0632 370/328 |
| 9,084,238 B2* | 7/2015 | Gao | ...................... | H04L 5/0055 |
| 10,027,391 B2* | 7/2018 | Janis | .................... | H04B 7/0456 |
| 10,505,618 B2* | 12/2019 | Guo | ...................... | H04B 7/0619 |
| 10,594,452 B2* | 3/2020 | Bhattad | ................. | H04W 72/04 |
| 10,673,500 B2* | 6/2020 | Huang | ................. | H04B 7/0473 |
| 2010/0173639 A1 | 7/2010 | Li et al. | | |
| 2011/0268077 A1 | 11/2011 | Wan et al. | | |
| 2013/0017852 A1 | 1/2013 | Liu et al. | | |
| 2013/0114437 A1 | 5/2013 | Yoo et al. | | |
| 2013/0308572 A1 | 11/2013 | Sayana et al. | | |
| 2015/0085680 A1 | 3/2015 | Vrzic et al. | | |
| 2015/0146670 A1 | 5/2015 | Liu et al. | | |
| 2016/0119762 A1* | 4/2016 | Zhu | .......................... | H04W 4/10 370/312 |
| 2016/0227521 A1 | 8/2016 | Han et al. | | |
| 2017/0180064 A1 | 6/2017 | Su et al. | | |
| 2017/0273059 A1 | 9/2017 | You et al. | | |

FOREIGN PATENT DOCUMENTS

| | | |
|---|---|---|
| CN | 101868988 A | 10/2010 |
| CN | 102907167 A | 1/2013 |
| CN | 103313273 A | 9/2013 |
| CN | 103825664 A | 5/2014 |
| CN | 103999389 A | 8/2014 |
| WO | 2009037580 A2 | 3/2009 |
| WO | 2013037060 A1 | 3/2013 |
| WO | 2014019141 A1 | 2/2014 |
| WO | 2014019202 A1 | 2/2014 |
| WO | 2016048055 A1 | 3/2016 |

OTHER PUBLICATIONS

Qualcomm Incorporated "NB-PDSCH design" 3GPP TSG RAN WG1 Meeting #84 R1-160877, St Julian's, Malta, Feb. 15-19, 2016, total 3 pages.

Jacob, Martin et al. "A Dynamic 60 GHz Radio Channel Model for System Level Simulations with MAC Protocols for IEEE 802.11ad" 2010 IEEE 14th International Symposium on Consumer Electronics, total 5 pages.

Nokia et al. "5G Channel Model for bands up to 100 GHz" Revised version, Mar. 2016, total 56 pages.

International Search Report dated Dec. 29, 2017 in corresponding International Patent Application No. PCT/CN2017/104200 (7 pages).

Written Opinion of the International Searching Authority dated Dec. 29, 2017 in corresponding International Patent Application No. PCT/CN2017/104200 (3 pages).

"Beam Management Procedure for NR MIMO," 3GPP TSG RAN WG1 Meeting #86, Gothenburg, Sweden, R1-166089, pp. 1-6, 3rd Generation Partnership Project, Valbonne, France (Aug. 22-26, 2016).

* cited by examiner

TRP1　　　　　　　　UE　　　　　　　　TRP2

S310 — A radio node determines one of space frequency block coding SFBC transmission and unicast transmission, as a receiving mode used by user equipment to receive a downlink physical control channel S320 — The radio node sends an indication message to the user equipment, where the indication message is used to instruct the user equipment to receive, in the receiving mode, the downlink physical control channel sent by the radio node

INDICATION METHOD AND APPARATUS FOR TRANSMITTING PHYSICAL CONTROL CHANNEL

CROSS-REFERENCE TO RELATED APPLICATIONS

This application is a continuation of International Application No. PCT/CN2017/104200, filed on Sep. 29, 2017, which claims priority to Chinese Application No. 201610877940.8, filed on Sep. 30, 2016. The disclosures of the aforementioned applications are hereby incorporated by reference in their entireties.

TECHNICAL FIELD

The present application relates to the communications field, and in particular, to an indication method and an apparatus for transmitting a physical control channel.

BACKGROUND

Figure 1:
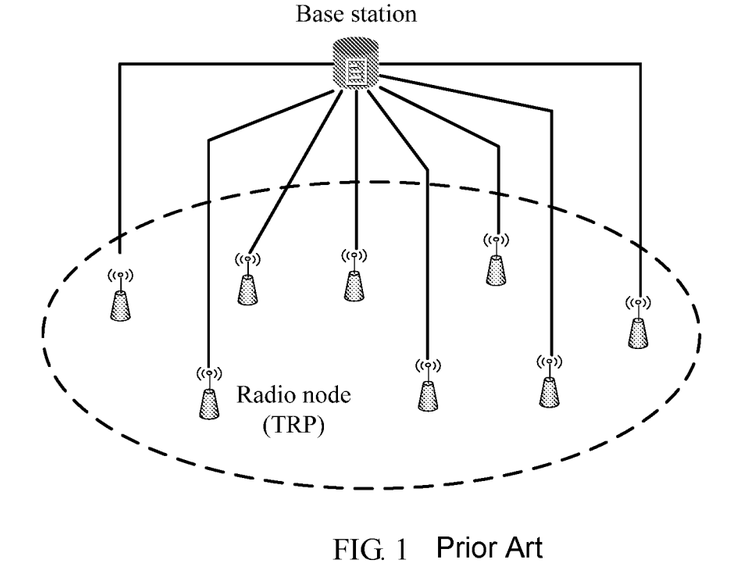
FIG. 1 is a system architectural diagram according to an embodiment of the present application.

High frequency (HF) is one of key technologies in a new radio access technology (NR), can provide more spectrum resources, support a larger quantity of antennas, and increase a system capacity, and therefore has been widely researched. However, because of a short-wave characteristic of a radio wave at a high frequency, a radio link is usually interrupted. As shown in FIG. 1, radio wave transmission is interrupted due to blocking resulting from many obstacles. Therefore, how to resolve a problem of relatively poor system performance resulting from radio transmission interruption becomes one of critical problems in high-frequency radio communication.

SUMMARY

The present application provides an indication method and an apparatus for transmitting control information, to resolve a problem of relatively poor system performance resulting from blocking of radio wave transmission in a radio transmission process.

According to a first aspect, an embodiment of the present application provides an indication method for transmitting a physical control channel, where the method includes:

determining, by a radio node, one of a space frequency block coding SFBC transmission technology and a single frequency transmission technology, as a receiving mode used by user equipment to receive a downlink physical control channel; and sending, by the radio node, an indication message to the user equipment, where the indication message is used to instruct the user equipment to receive, in the receiving mode, the downlink physical control channel sent by the radio node.

The radio node determines one of SFBC transmission and single frequency transmission as the receiving mode, and sends the indication message to the user equipment, to instruct the user equipment to receive, in the receiving mode determined by the radio node, downlink physical control information sent by the radio node. This avoids communication interruption when radio transmission is blocked, and improves system performance.

In a design solution, the method further includes:

sending, by the radio node, a configuration message to the user equipment, where the configuration message includes identifiers of at least two groups of space domain resources used by the radio node to send the downlink physical control channel, and the configuration message is used to instruct the user equipment to receive the downlink physical control channel sent by the radio node by using the at least two groups of space domain resources.

In another design solution, the receiving mode is corresponding to an effective time period, and the effective time period is a time interval at which the radio node delivers the indication message twice continuously.

In still another design solution, the configuration message is downlink control information DCI, a MAC control element, or a radio resource control RRC message.

According to a second aspect, an embodiment of the present application provides an indication method for transmitting a physical control channel, where the method includes:

receiving, by user equipment, an indication message sent by a radio node, where the indication message is used to instruct the user equipment to receive, in a receiving mode, a downlink physical control channel sent by the radio node, where the receiving mode is one of a space frequency block coding SFBC transmission technology and a single frequency transmission technology; and receiving, by the user equipment in the receiving mode, the downlink physical control channel sent by the radio node.

In a design solution, the method further includes:

receiving, by the user equipment, a configuration message sent by the radio node, where the configuration message includes identifiers of at least two groups of space domain resources used by the radio node to send the downlink physical control channel, and the configuration message is used to instruct the user equipment to receive the downlink physical control channel sent by the radio node by using the at least two groups of space domain resources.

In a design solution, the receiving mode is corresponding to an effective time period, and the effective time period is a time interval at which the radio node delivers the indication message twice continuously.

In another design solution, the configuration message is downlink control information DCI, a MAC control element, or a radio resource control RRC message.

According to a third aspect, an embodiment of the present application further provides an apparatus for transmitting a physical control channel, where the apparatus is a radio node. Based on a same application, the apparatus can implement any implementable design solutions in the first aspect. For brevity, details are not further described herein.

According to a fourth aspect, an embodiment of the present application provides an apparatus for transmitting a physical control channel, where the apparatus is user equipment. Based on a same application, the apparatus is configured to implement any possible design solutions in the second aspect. For brevity, details are not further described herein.

According to a fifth aspect, an embodiment of the present application provides an indication method for transmitting a physical control channel, where the method includes:

determining, by a radio node for user equipment, a receiving mode of downlink physical control channels sent in different transmission time units, where the receiving mode includes at least one of a space frequency block coding SFBC transmission technology and a single frequency transmission technology, and the downlink physical control channels sent in the different transmission time units carry same physical control information; and sending, by the radio node, an indication message to the user equipment, where the indication message is used to instruct the user equipment to receive, in the receiving mode, a downlink physical control channel sent by the radio node.

In a design solution, the indication message further includes sequence information of at least two space domain resources used by the radio node to send the downlink physical control channel.

In a design solution, the method further includes:

sending, by the radio node, a configuration message to the user equipment, where the configuration message includes identifiers of at least two groups of space domain resources used by the radio node to send the downlink physical control channel, and the configuration message is used to instruct the user equipment to receive the downlink physical control channel sent by the radio node by using the at least two groups of space domain resources.

In another design solution, the receiving mode is corresponding to an effective time period, and the effective time period is a time interval at which the radio node delivers the indication message twice continuously.

In another design solution, the configuration message is downlink control information DCI, a MAC control element, or a radio resource control RRC message.

In still another design solution, the configuration message includes the indication message.

According to a sixth aspect, an embodiment of the present application further provides an indication method for transmitting a physical control channel, where the method includes:

receiving, by user equipment, an indication message sent by a radio node, where the indication message is used to instruct the user equipment to receive, in a receiving mode of receiving downlink physical control channels in different transmission time units, a downlink physical control channel sent by the radio node.

The receiving mode includes at least one of a space frequency block coding SFBC transmission technology and a single frequency transmission technology, and the downlink physical control channels sent in the different transmission time units carry same physical control information.

In a design solution, the indication message further includes sequence information of at least two space domain resources used by the radio node to send the downlink physical control channel.

In a possible design, the method further includes: receiving, by the user equipment, a configuration message sent by the radio node, where the configuration message includes identifiers of at least two groups of space domain resources used by the radio node to send the downlink physical control channel, and the configuration message is used to instruct the user equipment to receive the downlink physical control channel sent by the radio node by using the at least two groups of space domain resources.

In a design solution, the receiving mode is corresponding to an effective time period, and the effective time period is a time interval at which the radio node delivers the indication message twice continuously.

In another design solution, the configuration message is downlink control information DCI, a MAC control element, or a radio resource control RRC message.

In another design solution, the configuration message includes the indication message.

According to a seventh aspect, an embodiment of the present application further provides an apparatus for transmitting a physical control channel, where the apparatus is a radio node. Based on a same application, the apparatus can implement any possible design solutions in the fifth aspect. For brevity, details are not further described herein.

According to an eighth aspect, an embodiment of the present application further provides an apparatus for transmitting a physical control channel, where the apparatus is user equipment. Based on a same application, the apparatus can implement any possible design solutions in the sixth aspect. For brevity, details are not further described herein.

According to a ninth aspect, an embodiment of the present application provides an indication method for transmitting information, where the method includes:

sending, by a radio node, a first message to user equipment through space frequency block coding SFBC transmission, where the first message is used to: when the user equipment learns that signal quality of a space domain resource that carries information through the SFBC transmission does not meet a demodulation threshold, instruct the user equipment to discard information carried by the corresponding space domain resource that does not meet the demodulation threshold.

In a design solution, the method further includes:

sending, by the radio node, a configuration message to the user equipment, where the configuration message includes identifiers of at least two groups of space domain resources used by the radio node to send downlink information, and the configuration message is used to instruct the user equipment to receive the downlink information sent by the radio node by using the at least two groups of space domain resources.

In a design solution, the configuration message is downlink control information DCI, a MAC control element, or a radio resource control RRC message.

According to a tenth aspect, an embodiment of the present application provides an indication method for transmitting information, where the method includes:

receiving, by user equipment, a first message sent by a radio node through space frequency block coding SFBC transmission, where the first message is used to: when the user equipment learns that signal quality of a space domain resource that carries information through the SFBC transmission does not meet a demodulation threshold, instruct the user equipment to discard information carried by the corresponding space domain resource that does not meet the demodulation threshold.

According to an eleventh aspect, an embodiment of the present application further provides an information transmission apparatus, where the apparatus is a radio node. Based on a same application, the apparatus can implement any possible design solutions in the ninth aspect. For brevity, details are not further described herein.

According to a twelfth aspect, an embodiment of the present application further provides an information transmission apparatus, where the apparatus is user equipment. Based on a same application, the apparatus can implement any possible design solutions in the tenth aspect. For brevity, details are not further described herein.

According to a thirteenth aspect, an embodiment of the present application further provides a transmission method, where the method includes:

sending, by a first radio node, an indication message to user equipment, where the indication message is used to instruct the user equipment to switch to using a beam used for receiving downlink information sent to the user equipment by the first radio node by using a first space domain resource;

receiving, by the first radio node, a measurement message sent by the user equipment, where the measurement message includes information about a second space domain resource that is used for receiving the downlink information and that is determined by the user equipment based on the indication message;

determining, by the first radio node, a second radio node based on information about the second beam; and sending, by the first radio node, a notification message to the second radio node, where the notification message is used to instruct the second radio node to send the downlink message to the user equipment.

According to a fourteenth aspect, an embodiment of the present application further provides a transmission method, where the method includes:

receiving, by user equipment, an indication message sent by a first radio node, where the indication message is used to instruct the user equipment to switch to using a beam used for receiving downlink information sent to the user equipment by the first radio node by using a first space domain resource; and sending, by the user equipment, a measurement message to the first radio node, where the measurement message includes information about a second space domain resource that is used for receiving the downlink information and that is determined by the user equipment based on the indication message, so that the first radio node determines the second space domain resource used for transmitting the downlink information to the user equipment.

According to a fifteenth aspect, an embodiment of the present application further provides an information transmission apparatus, where the apparatus is a radio node. Based on a same application, the apparatus can implement any possible design solutions in the thirteenth aspect. For brevity, details are not further described herein.

According to a sixteenth aspect, an embodiment of the present application further provides an information transmission apparatus, where the apparatus is user equipment. Based on a same application, the apparatus can implement any possible design solutions in the fourteenth aspect. For brevity, details are not further described herein.

According to the indication method and apparatus for transmitting control information provided in embodiments of the present application, the radio node determines the receiving mode used by the user equipment to receive the downlink control information sent by the radio node by using the at least two beams, and sends the receiving mode to the user equipment, so that the user equipment receives the downlink control information based on the receiving mode, so as to improve system performance.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may derive other drawings from these accompanying drawings without creative efforts.

DESCRIPTION OF EMBODIMENTS

The present application provides an indication method and an apparatus for transmitting control information, to resolve a problem of poor system performance resulting from transmission interruption caused because radio wave transmission is blocked when high frequency (HF) is used to transmit data. According to the embodiments of the present application, a radio node transmits downlink control information to user equipment by using at least two beams, and configures a corresponding receiving mode for the user equipment, so that the user equipment receives the downlink control information in the configured mode, so as to improve system performance.

In a new radio access technology (NR), namely, a 5G communications system, each base station may include a plurality of radio nodes, and each radio node may communicate with user equipment by using a plurality of beams. It should be noted that in the 5G communications system, the base station may have another name, and this is not limited in the present application. The radio node may be a transmission/reception point (TRP), as shown in FIG. 1.

A beam is a precoding vector having specific energy transmission directivity, and the precoding vector can be identified by using index information. The energy transmission directivity means: In a specific spatial location, a relatively high receive power, for example, a receive power that meets a received demodulation signal to noise ratio, is provided for receiving a signal on which precoding processing has been performed by using the precoding vector, while in another spatial location, a receive power for receiving the signal on which precoding processing has been performed by using the precoding vector is relatively low, and does not meet the received demodulation signal to noise ratio. Different transmission/reception points TRPs or different user equipments UEs may have different precoding vectors, that is, may be corresponding to different beams. Each transmission/reception point TRP or user equipment UE may have a plurality of different precoding vectors. Based on configurations or capabilities of different transmission/reception points TRPs or user equipment UEs, one transmission/reception point TRP or user equipment UE may use one or more of a plurality of different precoding vectors at one time point, or in other words, one or more beams may be formed at one time point.

The different beams may be defined as different spatial resources, and the different beams may be uniquely identified by using the index information.

Figure 2:
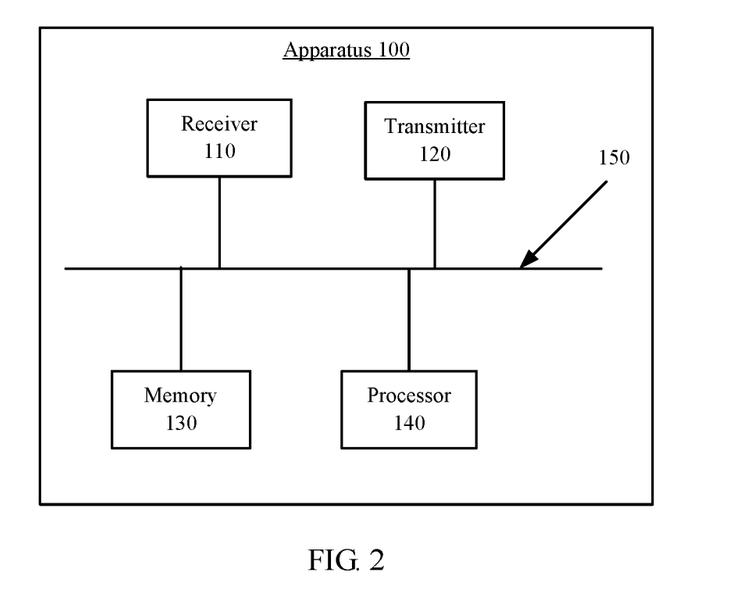
FIG. 2 is a schematic structural diagram of a control information transmission apparatus according to an embodiment of the present application.

FIG. 2 shows a control information transmission apparatus according to an embodiment of the present application.

As shown in FIG. 2, the apparatus 100 may include a receiver 110, a transmitter 120, a memory 130, a processor 140, and a communications bus 150. The receiver 110, the transmitter 120, the memory 130, and the processor 140 are connected by using the communications bus 150 to communicate with each other.

The receiver 110 is configured to receive data sent by another device. The transmitter 120 is configured to send corresponding data information to another device. The memory 130 is configured to store an instruction and data. The processor 140 is configured to call the instruction in the memory 130 and perform corresponding processing.

In this embodiment of the present application, the processor 140 may be a central processing unit (CPU), or the processor 140 may be another general purpose processor, a digital signal processor (DSP), an application-specific integrated circuit (ASIC), a field-programmable gate array (FPGA), another programmable logic device, a discrete gate or transistor logic device, a discrete hardware component, or the like. The general purpose processor may be a microprocessor, or the processor may be any conventional processor or the like.

In addition to a data bus, the communications bus 150 may include a power bus, a control bus, a status signal bus, and the like. However, for clear description, various types of buses are marked as the communications bus 160 in the figure.

The memory 130 may include a read-only memory and a random access memory, and provide the instruction and data to the processor 140. A part of the memory may further include a non-volatile random access memory.

The following clearly describes the technical solutions in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Before a radio node (for example, a TRP) communicates with user equipment, the radio node needs to establish a connection to the user equipment, and sends a configuration message to the user equipment. The configuration message may include identifiers of at least two groups of space domain resources used by the radio node to send downlink control information to the user equipment, and is used to instruct the user equipment to receive downlink control information sent by using specific groups of space domain resources, that is, beams.

The at least two groups of space domain resources may be dynamically or semi-statically configured by using downlink control information (DCI), a MAC control element (MAC CE), or a radio resource control message.

For ease of understanding and vivid description, each group of space domain resources is understood as one beam for description, and a beam described in the following is understood as a space domain resource.

At least two beams are dynamically or semi-statically configured at a time, and the configured at least two beams are distinguished by using beam identifiers that uniquely identify the beams. The at least two beams may be at least two beams that are effective once, that is, take effect only once. The at least two beams may be at least two beams that are temporarily effective. For example, before next configuration of other at least two beams, the configured at least two beams are always effective. The at least two beams may alternatively be at least two beams that are effective during a specific time period, and during configuration of the at least two beams, effective duration (or an effective time period) is configured for the at least two beams. The duration is a minimum scheduling time unit, and the minimum scheduling time unit may be an OFDM symbol, a slot including a plurality of continuous OFDM symbols in time, a subframe including a plurality of slots, or the like.

In the embodiments of the present application, a field of the configuration message carries an effective time of at least two beams, that is, a time interval at which the radio node delivers the configuration message continuously.

It should be noted that if the configured at least two beams are beams that are effective once, the radio node needs to configure, in each configuration message, at least two beams used by the user equipment to receive downlink control information sent by the radio node by using the at least two beams.

The configuration message may further include at least two beams (the at least two beams are distinguished by using beam identifiers) that are corresponding to the configured at least two beams and that are used for receiving the downlink control information sent by the radio node by using the at least beams, and/or information about a physical resource used by the user equipment to send uplink control information.

Optionally, in an embodiment of the present application, during transmitting the downlink control information to the user equipment by the radio node by using at least two beams, the radio node determines to transmit the downlink control information through space frequency block coding (SFBC) transmission or single frequency transmission by using the at least two beams, and configures, for the user equipment by using the configuration message, a receiving mode of receiving the downlink control information. For example, the downlink control information sent by the radio node by using the at least two beams is received through SFBC transmission, or the downlink control information sent by the radio node by using the at least two beams is received through single frequency transmission.

The space frequency block coding SFBC transmission technology includes the following steps:

1. Divide an original to-be-sent information symbol stream d(i) into two sub information symbol streams, and make two sub information symbol streams correspond to two layers. A first layer of information symbol stream is $x^{(0)}(i)=d^{(0)}(2i)$, and a second layer of information symbol stream is $x^{(1)}(i)=d^{(0)}(2i+1)$, where $i=0, 1, \ldots, M_{symb}/2$, and $M_{symb}$ is a total quantity of to-be-sent symbols.

2. An information symbol pair $[y^{(0)}(i)\ y^{(1)}(i)]^T$ including an information symbol sent through a first antenna port and an information symbol sent through a second antenna port is an information symbol pair obtained after the two layers of information symbols $x^{(0)}(i)$ and $x^{(1)}(i)$ in the previous step are precoded by using the following operations:

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}(x^{(0)}(i)) \\ \mathrm{Re}(x^{(1)}(i)) \\ \mathrm{Im}(x^{(0)}(i)) \\ \mathrm{Im}(x^{(1)}(i)) \end{bmatrix}$$

$[Z]^T$ indicates a transpose operation performed on a vector Z or matrix Z, Re(x) is an operation of obtaining a real part of x, and Im(x) is an operation of obtaining an imaginary part of x, where i=0, 1, ..., $M_{symb}/2$, and $M_{symb}$ is the total quantity of to-be-sent symbols.

3. Map a to-be-sent information symbol from each antenna port obtained in step 2 to a physical time-frequency resource and send the information symbol. A mapping method is as follows: Two consecutive information symbols (indexes of the two consecutive information symbols are 2i and 2i+1, respectively) in information symbols from each antenna port are sequentially mapped to two closest subcarriers that are corresponding to a same allocated OFDM (Orthogonal Frequency Division Multiplexing, orthogonal frequency division multiplexing) symbol and that can be used for resource mapping.

Demodulation reference signals corresponding to two antenna ports are used in the SFBC transmission technology.

According to the single frequency transmission technology, the original to-be-sent information symbol stream d(i) is directly mapped to an allocated physical time-frequency resource sequentially, and sent by using one antenna port.

A demodulation reference signal corresponding to one antenna port is used in the single frequency transmission technology.

If the radio node determines to send the downlink control information through SFBC transmission by using the at least two beams, SFBC transmission is configured, by using the configuration message, for the user equipment to receive the downlink control information.

Figure 3:
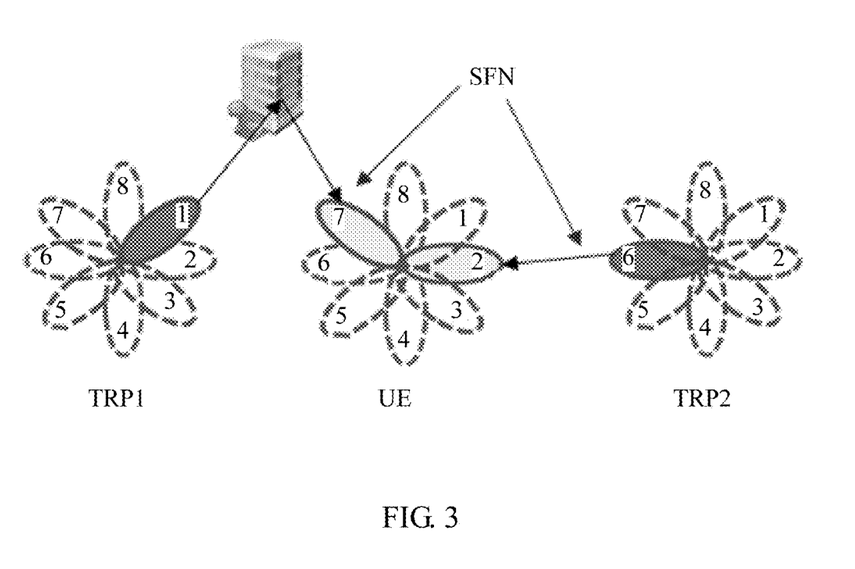
FIG. 3 is a schematic diagram of multi-beam transmission according to an embodiment of the present application.

Optionally, in an embodiment of the present application, that the radio node sends the downlink control information through SFBC transmission by using the at least two beams includes: sending the downlink control information through the at least two beams through SFBC transmission. The at least two beams may have a relatively low correlation. For example, receiving beams for the user equipment have a relatively large difference in beam angles of arrival. Specifically, as shown in FIG. 3, if the user equipment (UE) uses a beam 7 to receive downlink control information sent by a TRP 1 by using a beam 1, and the user equipment uses a beam 2 to receive downlink control information sent by a TRP 2 by using a beam 6. For an angle between the beam 2 and a beam 7 used by the user equipment to receive downlink control information, a larger angle indicates a lower correlation. In other words, the at least two beams may respectively belong to at least two TRPs or at least two low-correlation antenna panels.

Preferably, in an embodiment of the present application, a method 200 may include the following steps:

S210. A radio node determines, for user equipment, a receiving mode of downlink control channels sent in different transmission time units.

S220. The radio node sends an indication message to the user equipment, where the indication message is used to instruct the user equipment to receive, in the receiving mode, downlink control information sent by the radio node.

The receiving mode includes at least one of a space frequency block coding SFBC transmission technology and a single frequency transmission technology, and the downlink physical control channels sent in the different transmission time units carry same physical control information.

If the user equipment supports omnidirectional receiving, the at least two beams used by the radio node may occupy a same frequency domain resource or different frequency domain resources for sending downlink control information by using the space frequency block coding SFBC transmission technology and the single frequency transmission technology, and the user equipment receives, according to a sequence of time units and based on the indication message sent by the radio node according to a time unit, the downlink control information sent by the radio node by using the at least two beams.

If there is only one receiving beam for the user equipment at one time point, that is, only one receiving and transmitting beam alignment is supported at one time point, the at least two beams are used to receive the downlink control information by using the space frequency block coding SFBC transmission technology and the single frequency transmission technology in different corresponding time units. The different time units may be OFDM symbols, a symbol group including a plurality of continuous OFDM symbols in time that are used for transmitting a control channel resource, or the like.

In a design solution, the indication message further includes sequence information of at least two space domain resources used by the radio node to send the downlink physical control channel.

When receiving the indication message sent by the radio node, the user equipment is instructed, based on the indication message, to receive, in different transmission time units in the receiving mode of receiving the downlink physical control channels, the downlink physical control channels sent by the radio node. The receiving mode includes one of the space frequency block coding SFBC transmission technology and the single frequency transmission technology, and the downlink physical control channels sent in the different transmission time units carry same physical control information.

It should be noted that the indication message sent by the radio node and received by the user equipment may be a configuration message sent by the radio node, or may be an independent message. This is not limited in this embodiment of the present application.

If the indication message is a message independent of the configuration message sent by the radio node, the user equipment further needs to receive configuration information sent by the radio node, where the configuration information includes identifiers of at least two groups of space domain resources used by the radio node to send a downlink physical control channel, and the configuration message is used to instruct the user equipment to receive the downlink physical control channel sent by the radio node by using the at least two groups of space domain resources.

According to the indication method for transmitting control information provided in this embodiment of the present application, a time-division scheme in which at least two groups of space domain resources are used for transmission is used, and SFBC transmission of the downlink control information is performed in the beams, thereby improving system performance.

It should be noted that, in this embodiment of the present application, the at least two beams may alternatively be used for transmitting the downlink control information in a frequency division multiplexing mode, thereby improving system performance.

Figure 4:
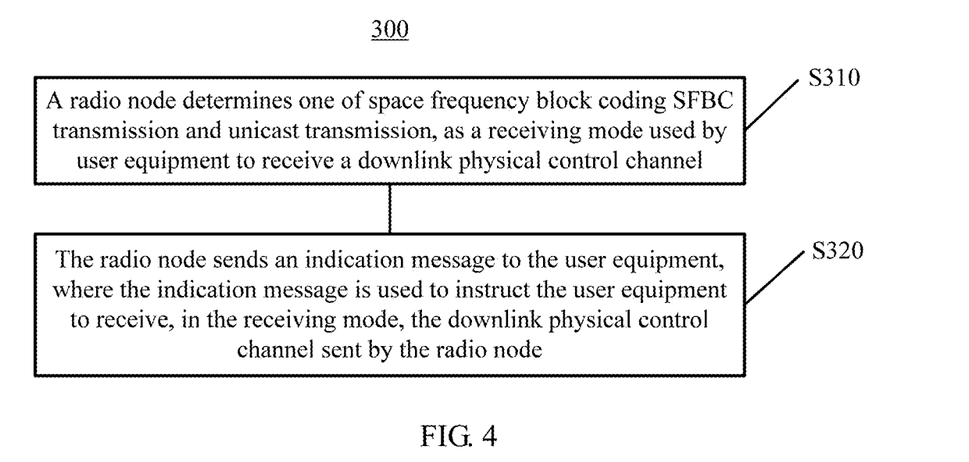
FIG. 4 is a flowchart of an indication method for transmitting control information according to an embodiment of the present application.

Preferably, in another embodiment of the present application, as shown in FIG. 4, a method 300 may include the following steps:

S310. A radio node determines one of space frequency block coding SFBC transmission and single frequency transmission, as a receiving mode used by user equipment to receive a downlink physical control channel.

S320. The radio node sends an indication message to the user equipment, where the indication message is used to instruct the user equipment to receive, in the receiving mode, the downlink control channel sent by the radio node.

If a TRP determines to send a downlink physical control channel through SFBC transmission by using at least two beams, when it is detected that a pair of beams (a beam used by the radio node to send physical downlink control channel and a beam used by the user equipment to receive the downlink physical control channel sent by using the beam) is blocked, for example, it is detected that a signal to noise ratio or channel quality indicator (CQI) corresponding to a sounding reference signal (SRS) is decreased sharply, the TRP switches to using a single frequency SFN mode to send the downlink physical control channel. Mode switching may be dynamically or semi-statically configured by using upper-level DCI, a MAC control element, or an RRC configuration message, and a corresponding message is the indication message sent by the radio node to the user equipment. The DCI may be sent at a low bit rate, by using a wide beam, or in a multi-beam SFN manner, so that reliability is ensured.

In a design solution, the receiving mode is corresponding to an effective time period, and the effective time period is a time interval at which the radio node delivers the indication message twice continuously.

After receiving the indication message sent by the radio node, the user equipment receives, based on the indication message in the receiving mode determined by the radio node, the downlink physical control channel sent by the radio node. The receiving mode is one of a space frequency block coding SFBC transmission technology and a single frequency transmission technology.

It should be noted that the indication message sent by the radio node and received by the user equipment may be a configuration message sent by the radio node, or may be an independent message. This is not limited in this embodiment of the present application.

If the indication message is an independent message sent by the radio node, the user equipment further needs to receive configuration information sent by the radio node, where the configuration information includes identifiers of at least two groups of space domain resources used by the radio node to send a downlink physical control channel, and the configuration message is used to instruct the user equipment to receive the downlink physical control channel sent by the radio node by using the at least two groups of space domain resources.

According to the indication method for transmitting control information provided in this embodiment of the present application, downlink control signaling may be used to switch between SFBC transmission and single frequency SFN transmission, thereby improving system performance.

In addition, it should be noted that, during sending the downlink control information by the radio node through SFBC transmission, at least two antenna ports need to be used for sending data and a pilot, where the pilot is used to assist the UE in performing channel estimation and data demodulation. A pilot corresponding to each antenna port uses an orthogonal pilot resource, including one or a combination of a time domain resource, a frequency domain resource, and a codeword resource.

When sending the downlink control information through SFN transmission, if the radio node uses one antenna port to send the data and the pilot, the pilot occupies one resource.

Preferably, in another embodiment of the present application, a radio node sends a message to the user equipment through space frequency block coding SFBC transmission, where the first message is used to: when the user equipment learns that signal quality of a space domain resource that carries information through the SFBC transmission meets a preset demodulation threshold, instruct the user equipment to discard information carried by a corresponding space domain resource that does not meet the demodulation threshold.

In other words, the radio node may configure a UE demodulation rule for the user equipment, for example, a demodulation threshold. When the radio node sends downlink information through SFBC transmission or another diversity manner by using at least two groups of space domain resources or a plurality of groups of space domain resources, for brief description, that the radio node transmits the downlink information by using two groups of space domain resources is used as an example. If it is detected that a difference between signal to noise ratios of the two groups of space domain resources is greater than a preset threshold, the user equipment directly discards downlink information corresponding to a beam with relatively poor signal to noise ratios. The UE demodulation rule may be configured for the user equipment by the radio node by using DCI information or an RRC message.

In this embodiment of the present application, in the method, the radio node further needs to send a configuration message to the user equipment, where the configuration message includes identifiers of at least two space domain resources used by the radio node to send the downlink information, and the configuration message is used to instruct the user equipment to receive the downlink information sent by the radio node by using the at least two space domain resources. The configuration information is downlink control information DCI, a MAC control element, or a radio resource control RRC message.

Figure 5:
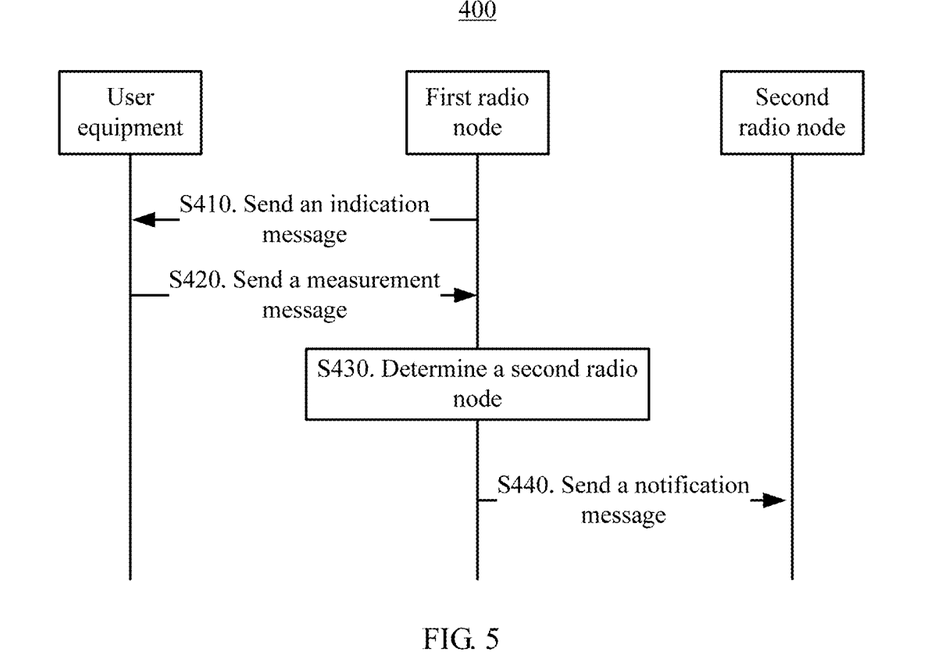
FIG. 5 is a flowchart of a transmission method according to an embodiment of the present application.

Preferably, in another embodiment of the present application, as shown in FIG. 5, a method 400 may include the following steps:

S410. A first radio node sends an indication message to user equipment, where the indication message is used to instruct the user equipment to switch to using a beam used for receiving downlink control information sent to the user equipment by the first radio node by using a first space domain resource.

S420. The first radio node receives a measurement message sent by the user equipment, where the measurement message includes information about a second space domain resource that is used for receiving the downlink control information and that is determined by the user equipment based on the indication message.

S430. The first radio node determines a second radio node based on the information about the second beam.

S440. The first radio node sends a notification message to the second radio node, where the notification message is used to instruct the second radio node to send the downlink message to the user equipment.

The first radio node and the second radio node are any two different nodes in a 5G system.

This embodiment may be applied to initial access, or may be applied to a communication transmission process.

Uplink transmission and downlink transmission of the user equipment are completed by respectively connecting the user equipment to different radio nodes, and the two groups of independent transmission links should have a relatively low correlation. For example, two groups of space domain resources are corresponding to TRPs that are in different directions, or two groups of space domain resources are corresponding to two low-correlation antenna panels in one TRP. When one of the links is blocked, the other link may still be used to perform normal unidirectional transmission, to ensure that a communication process resumes quickly, and prevent the UE from performing re-search, random access, and another process.

During initial access, the user equipment selects a corresponding radio node based on a power standard or the like, for example, selects a TRP A for uplink and downlink access. Then, the TRP A instructs, by using downlink control information (DCI), a MAC control element (MAC CE), or a high-layer control message (such as a Radio Resource Control RRC message), the user equipment to detect, through beam sweeping, a surrounding synchronization signal, channel state information-reference signal (CSI-RS), beam reference information (BRS), or other information that may carry beam information such as beam identifier (BID) information and channel information corresponding to a beam, such as channel state information (CSI) or reference signal received power (RSRP) information.

Through detection of the received synchronization signal or reference signal, the user equipment may select an optimal downlink transmitting beam, and report a suggestion (such as BID information) to the TRP A. A corresponding selection standard used by the user equipment should be based on an angle formed by a direction of a detected beam and a transmission direction of an existing uplink beam. As shown in FIG. 3, the user equipment uses the beam 7 to receive the downlink control information sent by the TRP1 by using the beam 1, the user equipment uses the beam 2 to send uplink control information to the TRP 2, and an angle formed by two links implements a possibly low correlation while ensuring power transmission. Compared with the prior art, a CSI measurement mechanism is used but measurement and reporting of a correlation between beams are not introduced.

Measurement based on a correlation between two links may be identified by using an angle formed by directions of two beams. In a design solution, a determining rule may be improved based on a threshold. The TRP A may provide a notification to a corresponding TRP B based on a result reported by the user equipment, and then the TRP B sends an acknowledgement (ACK) signal to the UE to acknowledge sending of a downlink beam.

Figure 6:
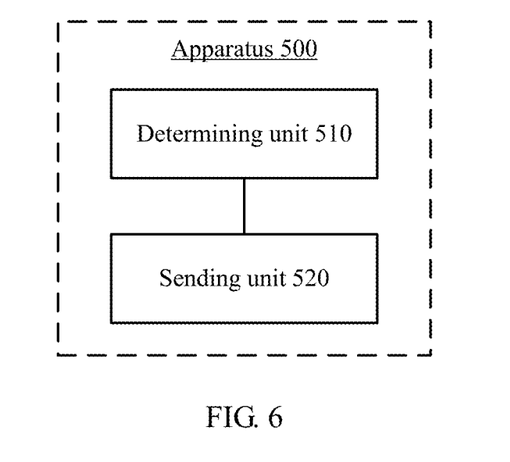
FIG. 6 is a schematic structural diagram of a control information transmission apparatus according to an embodiment of the present application.

FIG. 6 is a schematic structural diagram of a control information transmission apparatus according to an embodiment of the present application. As shown in FIG. 6, the apparatus 500 may include a determining unit 510 and a sending unit 520.

The determining unit 510 is configured to determine one of a space frequency block coding SFBC transmission technology and a single frequency transmission technology, as a receiving mode used by user equipment to receive a downlink physical control channel.

The sending unit 520 is configured to send an indication message to the user equipment, where the indication message is used to instruct the user equipment to receive, in the receiving mode, the downlink physical control channel sent by a radio node.

The apparatus provided in this embodiment determines one mode of SFBC transmission and SFN transmission to transmit uplink control information, and instructs the user equipment to receive, in the determined receiving mode, downlink control information transmitted by the radio node by using at least two beams. This avoids communication interruption when a group of beams is blocked, thereby improving system performance.

It should be noted that the units of the apparatus 500 provided in the embodiments of the present application can implement a method or steps in any solutions shown in FIG. 4. For brevity, details are not further described herein.

In another embodiment of the present application, a physical control channel transmission apparatus is further provided, where the apparatus includes a receiving unit, configured to receive an indication message sent by a radio node, and the indication message is used to instruct user equipment to receive, in a receiving mode, a downlink physical control channel sent by the radio node.

The receiving mode is one of a space frequency block coding SFBC transmission technology and a single frequency transmission technology.

Optionally, in another embodiment of the present application, the receiving unit is further configured to receive a configuration message sent by the radio node, where the configuration message includes identifiers of at least two groups of space domain resources used by the radio node to send the downlink physical control channel, and the configuration message is used to instruct the user equipment to receive the downlink physical control channel sent by the radio node by using the at least two groups of space domain resources.

The configuration message is downlink control information DCI, a MAC control element, or a radio resource control RRC message.

Optionally, in another embodiment of the present application, the receiving mode is corresponding to an effective time period, and the effective time period is a time interval at which the radio node delivers the indication message twice continuously.

The receiving unit in the apparatus provided in this embodiment of the present application is a receiver configured to receive the corresponding message.

It should be noted that the apparatus is configured to receive an indication message sent by the apparatus 500 in FIG. 6. For brevity, details are not further described herein.

Figure 7:
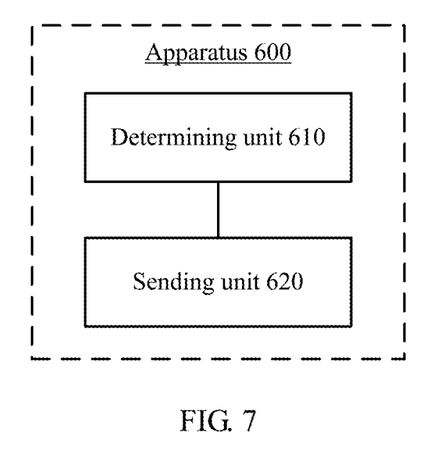
FIG. 7 is a schematic structural diagram of a control information transmission apparatus according to an embodiment of the present application.

FIG. 7 is a schematic structural diagram of a control information transmission apparatus according to an embodiment of the present application. As shown in FIG. 7, the apparatus 600 may include a determining unit 610 and a sending unit 620.

The determining unit 610 is configured to determine, for user equipment, a receiving mode of downlink physical control channels sent in different transmission time units.

The receiving mode includes at least one of a space frequency block coding SFBC transmission technology and a single frequency transmission technology, and the downlink physical control channels sent in the different transmission time units carry same physical control information.

The sending unit 620 is configured to send an indication message to the user equipment, where the indication message is used to instruct the user equipment to receive, in the receiving mode, a downlink physical control channel sent by a radio node.

The radio node transmits the downlink physical control channels in a time division multiplexing mode, and instructs the user equipment to receive, in the different transmission time units, the downlink physical control channels sent by the radio node, thereby improving system performance.

It should be noted that the units of the apparatus 600 provided in this embodiment of the present application can implement a method or steps in any solutions of the method 200. For brevity, details are not further described herein.

In another embodiment of the present application, an indication apparatus for transmitting a physical control channel is further provided, where the apparatus includes:

a receiving unit, configured to receive an indication message sent by a radio node, where the indication message is used to instruct the user equipment to receive, in different transmission time units in a receiving mode of receiving downlink physical control channels, the downlink physical control channels sent by the radio node.

The receiving mode includes at least one of a space frequency block coding SFBC transmission technology and a single frequency transmission technology, and the downlink physical control channels sent in the different transmission time units carry same physical control information.

In a design solution, the indication message further includes sequence information of at least two space domain resources used by the radio node to send a downlink physical control channel.

In another embodiment of the present application, the receiving unit is further configured to receive a configuration message sent by the radio node, where the configuration message includes identifiers of the at least two groups of space domain resources used by the radio node to send the downlink physical control channel, and the configuration message is used to instruct the user equipment to receive the downlink physical control channel sent by the radio node by using the at least two groups of space domain resources.

The configuration message is downlink control information DCI, a MAC control element, or a radio resource control RRC message.

In another embodiment of the present application, the receiving mode is corresponding to an effective time period, and the effective time period is a time interval at which the radio node delivers the indication message twice continuously.

In an embodiment, the configuration message may include an indication message. It should be noted that the indication message may alternatively be an independent message.

The receiving unit in the apparatus provided in this embodiment of the present application may be a receiver, configured to receive an indication message sent by the apparatus 600 in FIG. 7. For brevity, details are not further described herein.

An embodiment of the present application provides a schematic structural diagram of a control information transmission apparatus. The apparatus 600 may include a sending unit.

The sending unit is configured to send a first message about user equipment to the user equipment by using at least two beams, where the first message is used to: when the user equipment learns that signal quality of the at least two beams meets a preset demodulation threshold, instruct the user equipment to discard data carried by the corresponding transmitting beams that do not meet the demodulation threshold.

Figure 8:
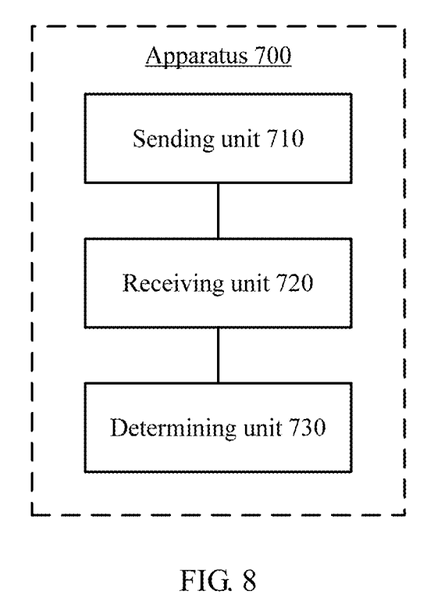
FIG. 8 is a schematic structural diagram of a control information transmission apparatus according to an embodiment of the present application.

FIG. 8 is a schematic structural diagram of a control information transmission apparatus according to an embodiment of the present application. As shown in FIG. 8, the apparatus 700 may include a sending unit 710, a receiving unit 720, and a determining unit 730.

The sending unit 710 is configured to send an indication message to user equipment, where the indication message is used to instruct the user equipment to switch to using a beam used for receiving downlink control information sent to the user equipment by a first radio node by using a first beam.

The receiving unit 720 is configured to receive a measurement message sent by the user equipment, where the measurement message includes information that is about a second beam for receiving the downlink control information and that is determined by the user equipment based on the indication message.

The determining unit 730 is configured to determine a second radio node based on the information about the second beam.

The sending unit 710 is further configured to send a notification message to the second radio node, where the notification message is used to instruct the second radio node to send a downlink control information to the user equipment.

By using beam switching, when communication links of a pair of beams are disconnected, another radio node can be notified of communication interruption in a timely manner, to resume communication in a timely manner, thereby further improving system performance.

It should be noted that the units of the apparatus 700 provided in this embodiment of the present application can implement a method or steps in any solutions shown in FIG. 5. For brevity, details are not further described herein.

In the foregoing specific implementations, the objective, technical solutions, and benefits of the present application are further described in detail. It should be understood that the foregoing descriptions are merely specific implementations of the present application, but are not intended to limit the protection scope of the present application. Any modification, equivalent replacement, or improvement made without departing from the principle of the present application shall fall within the protection scope of the present application.

What is claimed is:

1. A method comprising:
   determining, by a radio node, one of a space frequency block coding (SFBC) transmission technology and a single frequency transmission technology, as a receiving mode used by user equipment to receive a downlink physical control channel;
   sending, by the radio node in accordance with the determining, an indication message to the user equipment, wherein the indication message instructs the user equipment to receive, in the receiving mode, the downlink physical control channel sent by the radio node; and
   sending, by the radio node, a configuration message to the user equipment,
   wherein the configuration message comprises identifiers of at least two groups of space domain resources used by the radio node to send the downlink physical control channel,
   wherein the configuration message instructs the user equipment to receive the downlink physical control channel sent by the radio node by using the at least two groups of space domain resources,
   wherein each group of space domain resources corresponds to a corresponding beam of a set of beams,
   wherein the set of beams satisfy a low correlation criterion requiring an angle formed between directions of the beams to be less than a threshold, and
   wherein at least one beam belongs to another radio node.

2. The method according to claim 1, wherein the receiving mode corresponds to an effective time period, and the effective time period is a time interval at which the radio node delivers the indication message twice continuously.

3. The method according to claim 1, wherein the configuration message is downlink control information (DCI), a media access control (MAC) control element, or a radio resource control (RRC) message.

4. A method comprising:

receiving, by user equipment, an indication message sent by a radio node, wherein the indication message is used to instruct the user equipment to receive, in a receiving mode, a downlink physical control channel sent by the radio node, wherein the receiving mode is one of a space frequency block coding (SFBC) transmission technology and a single frequency transmission technology;

receiving, by the user equipment in the receiving mode, the downlink physical control channel sent by the radio node; and receiving, by the user equipment, a configuration message sent by the radio node, wherein the configuration message comprises identifiers of at least two groups of space domain resources used by the radio node to send the downlink physical control channel, wherein the configuration message instructs the user equipment to receive the downlink physical control channel sent by the radio node by using the at least two groups of space domain resources, wherein each group of space domain resources corresponds to a corresponding beam of a set of beams, wherein the set of beams satisfy a low correlation criterion requiring an angle formed between directions of the respective beams to be less than a threshold, and wherein at least one beam belongs to another radio node.

5. The method according to claim 4, wherein the receiving mode corresponds to an effective time period, and the effective time period is a time interval at which the radio node delivers the indication message twice continuously.

6. The method according to claim 4, wherein the configuration message is downlink control information (DCI), a media access control (MAC) control element, or a radio resource control (RRC) message.

7. A user equipment comprising:

a receiver, a processor, and a non-transitory computer-readable medium including computer-executable instructions, wherein the processor executes the computer-executable instructions to carry out a method on the user equipment comprising:

receiving, by the receiver, an indication message sent by a radio node, wherein the indication message instructs the user equipment to receive, in a receiving mode, a downlink physical control channel sent by the radio node, wherein the receiving mode is one of a space frequency block coding (SFBC) transmission technology and a single frequency transmission technology, receiving, in the receiving mode, the downlink physical control channel sent by the radio node; and receiving, by the receiver, a configuration message sent by the radio node, wherein the configuration message comprises identifiers of at least two groups of space domain resources used by the radio node to send the downlink physical control channel, wherein the configuration message instructs the user equipment to receive the downlink physical control channel sent by the radio node by using the at least two groups of space domain resources, wherein each group of space domain resources corresponds to a corresponding beam of a set of beams, wherein the set of beams satisfy a low correlation criterion requiring an angle formed between directions of the respective beams to be less than a threshold, and wherein at least one beam belongs to another radio node.

8. The user equipment according to claim 7, wherein the receiving mode corresponds to an effective time period, and the effective time period is a time interval at which the radio node delivers the indication message twice continuously.

9. The user equipment according to claim 7, wherein the configuration message is downlink control information (DCI), a media access control (MAC) control element, or a radio resource control (RRC) message.

* * * * *